US006388023B1

(12) United States Patent
Hsu et al.

(10) Patent No.: US 6,388,023 B1
(45) Date of Patent: May 14, 2002

(54) END-CAPPED UNSATURATED POLYETHERESTER, UNSATURATED POLYESTER AND VINYL MONOMER

(75) Inventors: Chih-Pin Hsu; Ming Yang Zhao; Linda Bergstrom, all of Kansas City, MO (US)

(73) Assignee: Cook Composites and Polymers Co., North Kansas City, MO (US)

( * ) Notice: Subject to any disclaimer, the term of this patent is extended or adjusted under 35 U.S.C. 154(b) by 0 days.

(21) Appl. No.: 09/505,078

(22) Filed: Feb. 16, 2000

Related U.S. Application Data

(62) Division of application No. 09/168,493, filed on Oct. 8, 1998, now abandoned.
(60) Provisional application No. 60/062,112, filed on Oct. 14, 1997, and provisional application No. 60/062,852, filed on Oct. 10, 1997.

(51) Int. Cl.[7] .......................... B32B 17/04; C08L 67/02; C08L 67/06
(52) U.S. Cl. ...................... 525/438; 428/297.4; 525/444
(58) Field of Search ................................ 525/444, 438; 428/297.4

(56) References Cited

U.S. PATENT DOCUMENTS

| | | | |
|---|---|---|---|
| 3,347,806 A | 10/1967 | Zimmerman | 260/22 |
| 3,701,748 A | 10/1972 | Kroekel | 260/40 |
| 3,883,612 A | 5/1975 | Pratt et al. | 260/862 |
| 3,933,757 A | 1/1976 | Pratt et al. | 260/75 A |
| 3,986,922 A | 10/1976 | Parker et al. | 162/5 |
| 4,029,848 A | 6/1977 | Nelson | 428/130 |
| 4,148,765 A | 4/1979 | Nelson | 260/22 |
| 4,246,367 A | 1/1981 | Curtis, Jr. | 525/49 |
| 4,295,907 A | 10/1981 | Cordts et al. | 156/246 |
| 4,348,499 A | 9/1982 | Nelson | 525/49 |
| 4,477,325 A | 10/1984 | Osburn | 204/159.12 |
| 4,480,077 A | 10/1984 | Hefner, Jr. | 525/530 |
| 4,525,544 A | 6/1985 | Nelson et al. | 525/531 |
| 4,710,420 A | 12/1987 | Tonoki et al. | 428/212 |
| 4,724,173 A | 2/1988 | Rockett et al. | 427/389.8 |
| 4,959,259 A | 9/1990 | Guibaud | 428/215 |
| 4,990,397 A | 2/1991 | Tsunemi et al. | 428/246 |
| 5,254,723 A | 10/1993 | Yang et al. | 560/240 |
| 5,319,006 A | 6/1994 | Yang et al. | 523/500 |
| 5,436,313 A | 7/1995 | Klang et al. | 528/274 |
| 5,436,314 A | 7/1995 | Yang et al. | 528/274 |
| 5,569,737 A | 10/1996 | Yang et al. | 528/274 |
| 5,580,909 A | 12/1996 | Cai et al. | 523/501 |
| 5,610,205 A | 3/1997 | Yang et al. | 522/102 |
| 5,612,444 A | 3/1997 | Cai et al. | 528/274 |
| 5,633,315 A | 5/1997 | Cai et al. | 524/801 |
| 5,637,630 A | 6/1997 | Atkins | 523/523 |
| 5,684,086 A | 11/1997 | Yang et al. | 525/49 |
| 5,770,659 A * | 6/1998 | Cai et al. | 525/438 |
| 5,780,558 A | 7/1998 | Klang et al. | 525/445 |
| 6,211,305 B1 * | 4/2001 | Hsu et al. | 525/442 |

FOREIGN PATENT DOCUMENTS

EP  0 755 976 A1  1/1997

\* cited by examiner

Primary Examiner—Robert E. L. Sellers
(74) Attorney, Agent, or Firm—Whyte Hirschboeck Dudek SC

(57) ABSTRACT

A compositon useful as an intermediate for a skin laminate and a fiber-reinforced composite comprises:

(A) At least 5 wt. % of an at least partially end-capped unsaturated polyetherester wherein the end-capping compound includes a compound having at least one epoxy group;

(B) an unsaturated polyester resin such that the weight ratio unsaturated polyester resin (B):polyetherester resin (A) is from about 10:90 to about 90:10;

(C) from about 10 to about 70 wt. % of at least one vinyl monomer such as styrene; and (D) a curing agent such as a free radical initiator and an accelerator.

13 Claims, No Drawings

END-CAPPED UNSATURATED POLYETHERESTER, UNSATURATED POLYESTER AND VINYL MONOMER

This application is a divisional of Application Ser. No. 09/168,493 filed Oct. 8, 1998, abandoned, which claims benefit of Ser. No. 60/062,112, filed Oct. 14, 1997, and claims benefit of Ser. No. 60/062,852, filed Oct. 10, 1997.

BACKGROUND OF THE INVENTION

1. Field of the Invention

This invention pertains to the field of resin systems including curable thermoset resins, composite materials and skin laminates for composite materials, and processes for making the same.

2. Description of Related Art

Known gel coated fiber-reinforced polymers are subject to blistering if immersed in water or solvents for a prolonged period of time unless special measures are taken to prevent this phenomenon. Blisters are raised by localized swelling of the gel coated laminate due to diffusion of water into the composite and the presence of water-soluble constituents within the laminate. The blisters not only effect the external appearance of the gel coated fiber-reinforced polymer article, but also eventually lead to reduced composite strength.

Several methods have been proposed to reduce blistering in gel coated composite materials. U.S. Pat. No. 4,724,173 describes using a permeable gel coat to allow the osmotically active molecules to diffuse from the osmotic centers through the gel coat at a defined transport rate whereby the osmotic pressure of the osmotic centers is reduced so as to reduce blistering. U.S. Pat. No. 4,477,325 describes a method of manufacturing a skin barrier which has improved water resistance to protect the composite material from hydrolysis. U.S. Pat. Nos. 4,480,077 and 4,525,544 describe vinyl ester resin compositions which may be used in the laminate construction to impart greater resistance to water permeation and U.S. Pat. No. 4,959,259 describes a bisphenolic polyester resin composition which may also be used to impart greater water permeation resistance.

The latter technique, using a laminate resin having greater corrosion and/or water resistance, is the most common technique used by the composite industry to reduce blistering. Those resins are typically vinyl ester resins or isophthalic polyester resins. Not only is that technique not always completely successful, it also increases the overall expense of the composite material and/or reduces the flexibility in choosing the laminating resin for other desired properties.

For these and other reasons, further improvements in the ability to prevent blistering are desired. These and other objectives are achieved by the present invention.

SUMMARY OF THE INVENTION

One aspect of this invention is curable thermoset resin compositions useful for imparting water and/or solvent resistance to gel coated fiber-reinforced polymers comprising:

(A) At least 5 wt. % of an at least partially end-capped unsaturated polyetherester resin;

(B) An unsaturated polyester resin having a ratio of the number average molecular weight to the average number of double bonds per polymer molecule in the range from about 200 to about 400, in an amount such that the weight ratio of polyester resin (B) to polyetherester resin (A) is in the range from about 10:90 to about 90:10;

(C) About 10 to about 70 wt. % of at least one vinyl monomer; and (D) A curing agent.

Another aspect for this invention is a method for making a curable thermoset resin compositions comprising combining:

(A). At least 5 wt. % of an at least partially end-capped unsaturated polyetherester resin;

(B) An unsaturated polyester resin having a ratio of the number average molecular weight to the average number of double bonds per polymer molecule in the range from about 200 to about 400, in an amount such that the weight ratio of polyester resin (B) to polyetherester resin (A) is in the range from about 10:90 to about 90:10;

(C) About 10 to about 70 wt. % of at least one vinyl monomer; and (D) A curing agent.

A further aspect of this invention is an intermediate for making a curable thermoset resin composition comprising (A) At least 5 wt. % of an at least partially end-capped unsaturated polyetherester resin;

(B) An unsaturated polyester resin having a ratio of the number average molecular weight to the average number of double bonds per polymer molecule in the range from about 200 to about 400, in an amount such that the weight ratio of polyester resin (B) to polyetherester resin (A) is in the range from about 10:90 to about 90:10; and (C) About 20 to about 50 wt. % of at least one vinyl monomer.

DETAILED DESCRIPTION OF THE INVENTION

Definitions

The term "end-capping compound" as used herein means a compound having at least one functional group capable of reacting with at least one reactive end group of the unsaturated polyetherester resin such that the acid number of the unsaturated polyetherester resin is reduced. When the end-capping compound has more than one functional group per molecule, then the functional groups are selected such that they have, under the same conditions, a greater propensity to react with a reactive end group of the unsaturated polyetherester resin than with another functional group of the end-capping compound to avoid substantial polymerization of the end-capping compound with itself. The functional groups of the end-capping compound are preferably the same, or are known to be substantially unreactive with each other.

The term "curing" and "cured" refer to the formation of a substantially irreversible three-dimensional crosslinking network in a curable polymer composition such that the polymer forms a structure that is substantially insoluble in solvents for the uncrosslinked polymer.

The term "bisphenol-A" refers to 2,2-bis(4-hydroxyphenylpropane).

The term "unsaturated polyetherester resin" means polymer resins of intermediate molecular weight that contain ethylenic unsaturation available for free-radical polymerization with a vinyl monomer, recurring ester units, and recurring polyether blocks. The polyether blocks have repeat units of oxyalkylene groups (-O-alkylene-), which in a preferred embodiment have from 2 to 10 carbon atoms each (e.g., oxypropylene, oxyethylene, etc.), more preferably from 2 to 4 carbon atoms. Preferably, the unsaturated polyetherester resins have an ether/ester mole ratio of at least about 0.75, more preferably at least about 1 and preferably not greater than about 3. The number average molecular weight of these resins is preferably in the range from about 500 to about 10,000. They have alcohol and/or carboxylic acid end groups which react with at least one of the end-capping compounds.

Unless otherwise specified herein, the term "viscosity" refers to the viscosity of a polymer in styrene monomer at 65 wt. % NVM (non-volatile material, see below) at 25 C. measured using a Brookfield Viscometer.

The term "NVM" refers to non-volatile material (a.k.a. "solids") dispersed in a volatile substance (e.g., styrene monomer) measured according to ASTM D1259.

The term "ASTM" refers to a well known collection of standard laboratory procedures for measuring the properties of materials published by the American Society for Testing and Materials.

Unless specified otherwise, all ratios, percentages, and parts are by weight.

A more detailed description of each component of the curable thermoset resin composition follows.

COMPONENT (A)

Suitable unsaturated polyetherester resins for making the corresponding end-capped resins include the reaction products of polyethers and unsaturated carboxylic anhydrides or unsaturated di-or polycarboxylic acids. Preferred polyethers include polyether polyols, such as polyoxyalkylene polyols, alkylene oxide-alkylene oxide copolymers, and the like, in which the alkylene group preferably has from 2 to 6 carbon atoms (for example, polyoxypropylene polyols, polyoxyethylene polyols, ethylene oxide-propylene oxide copolymers, etc.). These polyols preferably have average hydroxyl functionality in the range from about 2 to about 8 and preferably have a number average molecular weight in the range from about 250 to about 10,000. The unsaturated anhydrides are preferably cyclic anhydrides, such as maleic anhydride, succinic anhydride, phthalic anhydride, and the like. Preferred unsaturated di-or polycarboxylic acids include linear, branched, and cyclic $C_3$–$C_{40}$ dicarboxylic acids and $C_8$–$C_{40}$ aromatic dicarboxylic acids, such as maleic acid, fumaric acid, phthalic acid and isophthalic acid.

U.S. Pat. No. 5,319,006, which is incorporated herein by reference, describes one process for making the unsaturated polyetherester resins in which the polyether is reacted with a cyclic unsaturated carboxylic anhydride in the presence of a Lewis acid catalyst.

U.S. Pat. Nos. 5,436,313 and 5,436,314, also incorporated herein by reference, describe preferred methods for preparing the unsaturated polyetherester resins in which the catalyst for inserting anhydrides and dicarboxylic acids into the polyethers are protic acids having a pKa less than about 0 and metal salts thereof.

The unsaturated polyetherester resins are end-capped with at least one end-capping compound such that the end-capped resin has a lower acid number than the resin prior to end-capping. Preferably the acid number is decreased by at least 50 percent.

The end-capping compound may, for example, be dicyclopentadiene, an epoxy-containing compound or both.

The epoxy group-containing compound may be represented by the following formula:

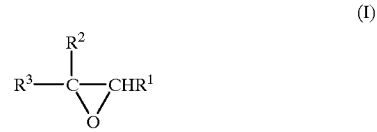

(I)

wherein $R^1$, $R^2$ and $R^3$ represent a hydrogen atom or a hydrocarbyl group optionally having one or more hetero atoms, provided that at least one of $R^1$, $R^2$, and $R^3$ is not a hydrogen atom. The hydrocarbyl group may be methyl, aliphatic, cycloaliphatic, or aromatic, combinations of two or more of methyl, aliphatic, cycloaliphatic and aromatic moieties, with or without hetero atoms. The hetero atoms may, for example, be oxygen or sulfur atoms present as ether or ester linkages between two or more methyl, aliphatic, cycloaliphatic, or aromatic moieties and/or the hetero atoms may be present in functional groups, such as additional groups of formula (VI). The hydrocarbyl group preferably does not contain functional groups reactive with the epoxy group on formula (VI). Preferably, the epoxy-containing compound has at least two hydrocarbyl groups that do not contain moities reactive with the polyetherester resin (A).

The number average molecular weight of the epoxy-containing compound is preferably no greater than 1500, preferably no greater than about 1000, and even more preferably no greater than 500. The epoxy group-containing compounds include, for example, glycidyl esters, glycidyl ethers, epoxy alkyls, epoxy cycloalkyls, epoxyalkylenes, aromatic epoxy compounds, such as p-glycidyl-styrenes, and the like, and mixtures thereof. Specific examples of the epoxy group-containing compounds include CARDURA® Resins (glycidyl esters available from the Shell Oil Company) such as CARDURA® E-10 Resin (a glycidyl ester of Versatic™ 10 Acid; GLYDEXX® available from Exxon Chemical Co., such as GLYDEXX® N-10 or ND-101; etc.

Suitable aromatic epoxy compounds include glycidyl ethers obtainable by the reaction of epichlorohydrin with an aromatic compound containing at least one hydroxyl group carried out under alkaline reaction conditions. The epoxy-containing compounds obtained when the hydroxyl group-containing compound is 2,2-bis(4-hydroxy-phenylpropane) (i.e., bisphenol-A) are represented by the structure below wherein n is zero or a number greater than 0, commonly in the range of 0 to 10, preferably in the range of 0 to 2.

(II)

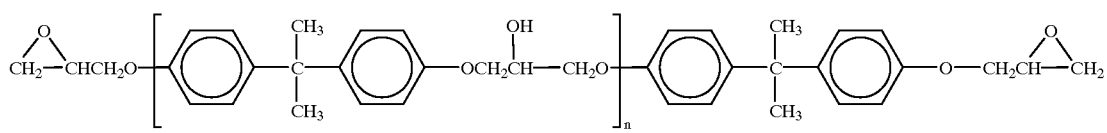

Other suitable epoxy compounds can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl) methane and 4,4'-dihydroxybiphenyl, or aliphatic polyols such as 1,4-butanediol and glycerol.

Preferred diepoxy compounds include those designated EPON® Resin commercially available from the Shell Oil Company, such as EPON® Resins 825, 826 and 828, each of which are reaction products of epichlorohydrin and bisphenol A in which the n value of the above formula is 0.04, 0.08 and 0.13, respectively. The commercially-available epoxy resin EPON® Resin 828 having a molecular weight of about 400 and an epoxide equivalent (ASTM D-1652) of about 185–192, is a preferred diepoxy compound because of its low viscosity, mechanical performance and commercial availability.

Additional examples of suitable bisphenol-A type epoxy compounds include the D.E.R.™ resins available from The Dow Chemical Company, such as D.E.R.™ 330, 331, 332 and 383 and the ARALDITE™ GY resins available from Ciby-Geigy such as ARALDITE™ GY 6004, 6005, 6008, 6010 and 2600.

In a preferred embodiment, the at least one end-capping compound comprises at least some, more preferably at least about 20 wt. %, even more preferably at least about 50 wt. % and preferably less than or equal to about 80 wt. %, DCPD and/or monofunctional epoxy-containing compound, which may be obtainable by reacting the same with the unsaturated polyetherester resin in the corresponding proportions. In one embodiment, the at least one end-capping compound comprises a mixture of (a) DCPD and/or monofunctional epoxy-containing compound and (b) a di-or polyfunctional epoxy-containing compound, preferably wherein the ratio of (a) to (b) is in the range from about 10:90 to about 90:10, more preferably from about 20:80 to about 80:20. In addition to the other advantages of this invention, curable thermoset compositions containing these end-capped unsaturated polyester resins also have the advantage of ease of application due to the low viscosity of such resins. In a preferred embodiment, the viscosity of the end-capped unsaturated polyetherester resin does not exceed 1500 cp (1.5 Pa.s), and the viscosity of the curable thermoset composition preferably does not exceed 500 cp (0.50 Pa.s)

The at least partially end-capped unsaturated polyetherester resin is present in the curable thermoset resin composition in an amount of at least 5 wt. %, preferably at least about 10 wt. % up to about 80 wt. %, more preferably up to about 60 wt. %.

COMPONENT (B)

Dicyclopentadiene (DCPD) polyester resins suitable as component (B) are preferably derived from dicyclopentadiene, maleic anhydride and a polyhydric alcohol, preferably a glycol (e.g., propylene polyhydric alcohol, ethylene polyhydric alcohol, diethylene polyhydric alcohol, dipropylene polyhydric alcohol, or mixtures of these). The reaction is preferably performed in the presence of water under conditions to generate maleic acid from the maleic anhydride so as to form dicyclopentadiene maleate and then esterifying the maleate with the glycol to form the unsaturated polyester resin. The DCPD unsaturated polyester resin preferably has a viscosity not greater than about 500 cp (0.50 Pa.s).

The preparation of DCPD polymer resins is described, for example, in U.S. Pat. Nos. 3,933,757; 3,347,806; 3,883,612; 4,029,848; 4,148,765; 4,348,499; and 4,246,367, the teachings of which are incorporated herein by reference.

DCPD polyester resins are typically available as solutions in vinyl aromatic monomers such as styrene. To the extent that the vinyl aromatic monomer is already introduced by the DCPD polyester resin solution, that counts towards the presence of vinyl monomer component (C).

The proportion of DCPD polyester resin to polyetherester resin falls within a weight ratio range of about 10:90 to about 90:10, and preferably within the range from about 25:75 to about 75:25.

COMPONENT (C)

The vinyl aromatic monomers useful as component (C) of this invention include styrene, vinyl toluene, cholorostyrenes, tert-butylstyrene, dimethylstyrenes, divinylbenzene, diallylphthalate, mono- or multifunctional lower alkyl esters of acrylic and methacrylic acids, and the like, and mixtures thereof. Styrene is preferred. The vinyl aromatic monomer is present in an amount effective to result in a cured thermoset when reacted with the other components of the curable thermoset resin composition in the presence of a free-radical initiator. The amount of vinyl aromatic monomer in the curable thermoset resin composition is in the range from about 10 to about 70 wt. %. Preferably, the vinyl monomer is present in an amount of at least about 20 wt. %, more preferably at least about 30 wt. %, up to about 60 wt. %, more preferably up to about 50 wt. %, and even more preferably up to about 36 wt. %.

COMPONENT (D)

The curing agent (D) comprises at least one free-radical initiator. Useful free-radical initiators are those well known and commercially available in the unsaturated polyester industry. They include peroxide and azo-type initiators. Peroxide initiators include, for example, methylethyl ketone (MEK) peroxide, benzoyl peroxide, tert-butylperbenzoate, ter-butylperoxide, and the like, and mixtures thereof. The initiator is used in an amount effective to react the vinyl aromatic monomer and other polymer components of the curable thermoset resin composition to produce a cured thermoset. Typically, the amount is within the range from about 0.5 to about 3 wt. %, more preferably from about 1 to about 2 wt. %, based on the weight of the curable thermoset resin composition.

An accelerator is often combined with the free-radical initiator in the curing agent to allow curing at lower temperatures. Examples of accelerators include dimethylaniline and salts of transition metals (cobalt, iron, mangenese, copper, zinc, or vanadium), such as cobalt naphthenate, cobalt octanoate, and the like.

Optional Ingredients

Further components may be added to the curable thermoset resin compositions of this invention. Such components include reenforcing agents such as fibers, for example glass, fibers or organic fibers, which may be in chopped form or in the form of a fabric or mat; fire retardants (phosphorous or antimony compounds, aluminum trihydrate, halogenated waxes, etc.), antioxidants, free radical initiator inhibitors (e.g., to prevent premature initiation of polymerization), pigments, colorants, mold release agents, inert fillers (calcium carbonate, clays, talc, etc.), low-profile or low-shrink additives, thickeners (magnesium oxide, magnesium hydorxide, calcium oxide, etc.), etc. When reinforcing fiber is used, the amount of fiber is preferably at least 5 wt. %, more preferably at least about 10 wt. %, up to about 80 wt.

%, more preferably up to about 60 wt. %, of the total weight of the composition.

Utility of the Curable Thermoset Resin Composition

The curable thermoset resin compositions of this invention, when combined with a reinforcing fiber may be used to obtain a fiber-reinforced polymer composite by curing the thermoset resin composition.

The curable thermoset resin composition of this invention may also be used to prepare an intermediate for making a skin laminate by combining the curable thermoset resin composition with reinforcing fibers in the form of a sheet preferably having an average cross-sectional thickness of at least about 10 mil (0.25 mm), more preferably from about 20 mil (0.5 mm) up to about 200 mil (5 mm), more preferably up to 100 mil (22.5 mm), even more preferably up to 30 mil (0.8 mm). The fiber content of the skin laminate is preferably in the range from about 25 to about 45 wt. %. The fiber is preferably about 0.5 inch to about 2 inch (about 1 to about 5 cm) chopped fiber or a shear of a continuous strand fiber mat. The skin laminate intermediate may be used between a gel coat layer and a fiber-reinforced polymer layer in a gel coated polymer laminate to improve water and/or chemical resistance and also to improve the surface appearance of the laminate.

Water and/or chemical resistance of the gel coated polymer laminate may also be improved by interposing just the curable thermoset resin composition, with or without optional components, between the gel coat layer and the fiber-reinforced polymer layer.

An advantage of interposing the thermoset resin of the present invention between a gel coat layer and the fiber-reinforced polymer layer is to prevent blistering due to the migration of water and/or other low molecular weight substances, such as organic solvents, through the gel coat into the fiber-reinforced polymer, causing swelling, delamination, and other problems in the fiber-reinforced polymer layer. The swelling can cause a blister under the gel coat and continued migration of water and/or other solvents into the fiber-reinforced polymer can eventually lead to loss of strength in the fiber-reinforced polymer laminate.

In one embodiment, blistering of a gel coated fiber-reinforced polymer is reduced by applying at least one layer of the curable thermoset resin composition or the skin laminate intermediate between the gel coat layer and the fiber-reinforced polymer layer and curing the curable thermoset resin composition. Preferably, this is carried out by applying a gel coat composition to a mold, at least partially curing the gel coat composition, applying at least one curable thermoset resin composition or the skin laminate intermediate to the at least partially cured gel coat, at least partially curing the curable thermoset resin composition, applying at least one fiber-reinforced polymer layer to the at least partially cured thermoset resin composition layer, and curing the resulting product to form the gel coated fiber-reinforced polymer.

The polyester resin used to make the fiber-reinforced polyester resin may be any general purpose polyester resin known in the art, such as orthophthalic acid-based polyester resins. Preferred polyester resins are are those with a molecular weight/double bond or vinyl group (—C═C—) factor between about 150 and about 500, more preferably between about 200 and about 350 (as further described in U.S. Pat. Nos. 3,701,748; 4,295,907; and 5,637,630 which are incorporated herein by reference). These resins are made from a reaction of one of more glycols with an unsaturated dicarboxylic acid or its anhydride or with a mixture of the unsaturated acid or its anhydride with a saturated dicarboxylic acid or its anhydride. The reaction mixture may also include dicyclopentadiene to control the molecular weight of the polyesters as described in U.S. Pat. Nos. 3,883,612 and 3,986,922, which are incorporated herein by reference. The unsaturated polyester resin typically has a number average molecular weight in the range from about 500 to about 5,000, preferably in the range from about 700 to about 2,000. Examples of suitable unsaturated polyester resins include the STYPOL® polyester resins made by Cook Composites & Polymers, Inc. The polyester resin is applied as a matrix precursor and then cured, for example,by using a curing agent described above for the polyetherester resin.

The gel coat composition may be any of those that are well known and available in the art. The gel coat is typically 10 to 25 mils (0.2 to 0.6 mm) in thickness, and is the surface coating of the molded part. The gel coat provides the finishing color and surface profile of the part. Gel coats are well known and various grades are commercially available. The selection of gel coat will depend upon the desired characteristics of the part relative to, among other things, weatherability, hydrolytic stability, and surface finishing. Examples of commercially available gel coat materials include gel coat materials available from Cook Composites and Polymers under the marks POLYCOR®, ARMORCOTE®, BUFFBACK®, ENVIROCOR®, and LOVOCOR®.

Examples of the various types of reinforcement fibers that can be used in the practice of this invention are glass fibers, carbon fibers, various aramid fibers, and other types of natural and synthetic fibers. The typical fiber content of the composite is between about 10 and 80 percent by weight.

The composite and the molded part can, and often are, constructed in one operation. First, a gel coat is usually applied to the surface of the mold, at least partially cured, and then a skin laminate is applied over the at least partially cured gel coat. These are open mold operations. Then the fiber-reinforced polyester matrix precursor is applied, for example,by hand lay-up or spray-up, or the fiber reinforcement is applied to the skin laminate, the mold is closed, and the polyester matrix precursor is injected into the closed mold, preferably with the closed mold under vacuum. The precursor is then allowed to cure, with or without a heat supplement, and the part or article demolded.

EXAMPLES

Resin A

Resin A is an end-capped unsaturated polyetherester resin blended with styrene monomer. The unsaturated polyetherester resin is prepared by charging a 5 liter flask, equipped with an agitator, condenser, thermometer and sparge tube for introducing nitrogen gas, with 1418 grams ACCLAIM™ Polyol 2200 (a 2000 MW polyoxypropylene diol available from ARCO Chemical Co.), 442 grams propylene glycol, 1140 grams maleic anhydride and 2.3 grams p-toluenesulfonic acid monohydrate and heating the mixure to 195 C. for 4 hours while introducing nitrogen gas until the acid number drops to 110 mg KOH/g. End-capping is conducted by reducing the temperature of the reaction mixture to 140 C., introducing 260 g DCPD dropwise to the resulting mixture, and maintaining the 140 C. -temperature for 4 hours until the acid number is reduced to about 84 mg KOH/g. The mixture is then charged with 0.7 g DMP-30 (2,4,6-trisdimethylaminomethylphenol), mixed and maintained at 140 C. for 5 minutes, after which 675 g EPON® Resin 828 (available from the Shell Oil Co.) is added, the reaction mixture continues to be mixed and is maintained at a temperature of 140–150 C. until the acid number drops to 30 mg KOH/g. The reaction product is blended with 1500 g styrene monomer to form about 5,000 g of a clear resin solution containing the end-capped resin (Resin A) having a viscosity of 1100 cp (1.100 Pa.s) and 65 wt. % NVM.
Resin B Resin B is also an end-capped unsaturated polyetherester resin blended with styrene monomer. The end-capped unsaturated polyetherester resin is prepared the same way as that of Resin A, except that a mixture of 520 g EPON® Resin 828 and 310 g CARDURA® E-10 Resin (a glycidyl ester available from Shell Oil Co.) in place of the 675 g EPON® Resin 828 of the Resin A procedure. The resulting end-capped unsaturated polyetherester resin (Resin B) is blended with styrene monomer such that the blend has a viscosity of 385 cp (0.385 Pa.s) and 65 wt. % NVM.
DCPD Resin DCPD resins is a DCPD unsaturated polyester resin blended with styrene. The DCPD unsaturated polyester resin is prepared by charging a 4 liter resin kettle, equipped with a mechanical stirrer, nitrogen sparge tube, thermocouple (for measuring temperature), and a distillation head, with 1032 g maleic anhydride, heating the maleic anhydride to 150 F. (66 C.), slowly adding about 207 g water to the maleic anhydride and allow the temperature to rise to about 245 F. (118 C.) due to the heat given off by the exothermic reaction between the maleic anhydride and the added water, and then, when the temperature begins to drop of its own accord, adding 1392 g DCPD at a rate that maintains the temperature of the reactants between about 245 and 265 F. (between about 118 C. and 129 C.) until the acid number of the reaction mixture is 245 KOH/g or less. Then 415 g of ethylene glycol are added to the resulting reaction mixture and the temperature of the reaction mixture is raised to 400 F. (204 C.) and maintained at about that temperature until the acid number drops to 42 KOH/g. A vacuum (i.e., negative pressure differential) of 25 inches Hg (85 kPa) is applied to the mixture for about 30 minutes as the reaction temperature is allowed to cool. The reaction product is then blended with 1200 g styrene.
Preparation of the Curable Thermoset Resins of the Invention Resin A and DCPD Resin are combined in the proportions shown in Table 1 below to make Examples 1 and 2 of this invention. For these examples, styrene monomer is added to adjust the wt. % NVM from 65 wt. % to 60 wt. %. A catalyst system is added to cure each example at room temperature, which consists of 1.63 wt. % MEK peroxide, 0.15 wt. % cobalt naphthenate, and 0.12 wt. % N,N-dimethylacetoacetamide. The results obtained are shown in Table 1 below.

TABLE 1

Result of Curing Examples 1 and 2 of the Invention

| Component/Property | Example 1 | Example 2 |
|---|---|---|
| Resin A | 80 | 60 |
| DCPD Resin | 20 | 40 |
| % Nonvolatile Material (NVM) | 60 | 60 |
| Gel Time (min.) (1.63% DDM-9 (Lucidol)) | 22 | 17 |
| Gel to Peak Exotherm (min.) | 11 | 13 |
| Maximum Exotherm Temperature | 302° F. (150° C.) | 366° F. (186° C.) |

Gel coated laminates are prepared by spraying a full ISO/NPG type of gel coat on a glass mold, drawing down the gel coat to 28 and 48 mil (0.58 and 1.22 mm) "wet" thickness, and then letting the gel coat cure for 1 hour at ambient temperature. A skin laminate is applied to the gel coat consisting of 2 plies of 1.5 ounce (42.5 g) fiberglass mat saturated with either the Example 1 or the Example 2 resin blend, as indicated in Table 2 below, such that each skin laminate had a 30 wt. % glass content. The cure time for skin laminate is 2 hours at ambient temperature. The main laminate consisting 4 plies of 1.5 ounce (42.5 g) fiberglass mats with 30 wt. % glass content are applied after the skin laminate. A typical marine grade laminate resin, STYPOL® 40-4822, is used. The laminate is cured at ambient temperature for at least 16 hours before the water boil test was performed. Table 2 shows the surface profile ratings.

TABLE 2

|  | Before | 100 Hours | 150 Hours |
|---|---|---|---|
| Example 1 |  |  |  |
| Longwave, mean | 1.8 | 64.1 | 81.8 |
| Shortwave, mean | 1.3 | 59.0 | 58.4 |
| Rating, mean | 10.4 | 1.7 | 0.5 |
| ANSI* Rating | — | 4.0 | — |
| Example 2 |  |  |  |
| Longwave, mean | 1.2 | 51.2 | 74.1 |
| Shortwave, mean | 0.8 | 42.5 | 60.3 |
| Rating, mean | 10.5 | 2.6 | 1.0 |
| ANSI* Rating | — | 4.2 | — |

*ANSI refers to the American National Standards Institute. The "ANSI Rating" refers to a surface profile test described in the publication ANSIZ124.1-1987 section 6.3. A lower ANSI rating indicates better surface profile. An ANSI rating greater than 9 is considered failure.

The waviness rating values (ACT™ Orange Peel Standards) are typical industry visual test methods used to describe the surface appearance of an object. A BYK-Gardner wave-scan is used to measure the surface appearance of various test panels. The wave-scan can report the results in both long-term (structure size greater than 0.6 mm) and short-term waviness (structure size less than 0.6 mm). Both long-term and short-term waviness are rated from 0 to 100. The higher the number, the more waviness is observed. The long-term and short-term waviness are then mathematically correlated to a surface rating value from 0 to 10. The higher the number, the smoother the surface appears.

What is claimed is:

1. A curable thermoset resin composition useful for imparting water and/or solvent resistance to gel coated fiber-reinforced polymers comprising:

(A) At least 5 wt. % of an at least partially end-capped unsaturated polyetherester resin obtained by (1) reacting at least one polyether, the polyether selected from the group consisiting of polyether polyols, alkylene oxide-alkylene oxide copolymers, wherein the alkylene group of each alkylene oxide is different, and combinations thereof, and at least one ethylenically unsaturated anhydride or dicarboxylic acid in the presence of at least one catalyst effective to promote insertion of the anhydride or dicarboxylic acid into carbon-oxygen bonds of the polyether to produce unsaturated polyetherester resin polymer chains and (2) reacting the unsaturated polyetherester resin polymer chains with at least one end-capping compound to form the at least partially end-capped polyetherester resin, wherein the at least one end-capping compound comprises at least one compound having at least one epoxy group;

(B) an unsaturated polyester resin having a ratio of the number average molecular weight to the average number of double bonds per polymer molecule in the range from about 200 to about 400, in an amount such that the weight ratio of polyester resin (B) to polyetherester resin (A) is in the range from about 10:90 to about 90:10;

(C) about 10 to about 70 wt. % of at least one vinyl monomer; and (D) a curing agent.

2. The composition according to claim 1, wherein the at least one compound having at least one epoxy group is a compound having the formula:

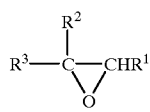

(I)

wherein $R^1$, $R^2$, and $R^3$ represent a hydrogen atom or a hydrocarbyl group optionally having one or more hetero atoms, provided that at least one of $R^1$, $R^2$, and $R^3$ is not a hydrogen atom.

3. The composition according to claim 1, wherein the compound having at least one epoxy group has a number average molecular weight less than or equal to 500.

4. The composition according to claim 3, wherein the at least one compound having at least one epoxy group is a reaction product of epichlorohydrin and bisphenol-A.

5. The composition according to claim 1, wherein the at least one end-capping compound has been added until the acid number of the end-capped unsaturated polyetherester (A)(2) is less than about 50 percent of the acid number of the unsaturated polyetherester (A)(1) prior to end-capping.

6. The composition according to claim 1, wherein the unsaturated polyester resin (B) is derived from at least dicyclopentadiene, an unsaturated carboxylic acid anhydride, and a glycol.

7. The composition according to claim 1, wherein the vinyl monomer (C) is styrene.

8. The composition according to claim 1, wherein the curing agent (D) comprises a free radical initiator and an accelerator.

9. The composition according to claim 1, wherein the at least partially end-capped unsaturated polyetherester has a viscosity not greater than 1500 cp and is present in an amount from about 10 wt. % to about 80 wt. %, and the weight ratio of polyester resin (B) to polyetherester resin (A) is in the range from about 25:75 to about 75:25.

10. An intermediate for making a skin laminate comprising reinforcing fibers and the curable thermoset resin composition according to claim 1 in the form of a sheet having a cross-sectional thickness less than 1 percent of its total surface area.

11. An intermediate for making a skin laminate comprising reinforcing fibers and the curable thermoset resin composition according to claim 9 in the form of a sheet having a cross-sectional thickness less than 1 percent of its total surface area.

12. A fiber-reinforced polymer composite obtained by combining a curable thermoset resin composition according to claim 1 with reinforcing fiber and curing the curable thermoset resin composition.

13. A method for making a curable thermoset resin composition comprising combining:

(A) At least 5 wt. % of an at least partially end-capped unsaturated polyetherester resin obtained by (1) reacting at least one polyether, the polyether selected from the group consisiting of polyether polyols, alkylene oxide-alkylene oxide copolymers wherein the alkylene group of each alkylene oxide is different, and combinations thereof, and at least one ethylenically unsaturated anhydride or dicarboxylic acid in the presence of at least one catalyst effective to promote insertion of the anhydride or dicarboxylic acid into carbon-oxygen bonds of the polyether to produce unsaturated polyetherester resin polymer chains and (2) reacting the unsaturated polyetherester resin polymer chains with at least one end-capping compound to form the at least partially end-capped polyetherester resin, wherein the at least one end-capping compound comprises at least one compound having at least one epoxy group;

(B) An unsaturated polyester resin having a ratio of the number average molecular weight to the average number of double bonds per polymer molecule in the range from about 200 to about 400, in an amount such that the weight ratio of polyester resin (B) to polyetherester resin (A) is in the range from about 10:90 to about 90:10;

(C) About 10 to about 70 wt. % of at least one vinyl monomer; and (D) A curing agent.

* * * * *